United States Patent [19]

Meuleman

[11] 4,424,708
[45] Jan. 10, 1984

[54] FUEL CELL LEAK DETECTOR

[75] Inventor: Gaston Meuleman, Hawthorne, Calif.

[73] Assignee: Northrop Corporation, Hawthorne, Calif.

[21] Appl. No.: 339,748

[22] Filed: Jan. 15, 1982

[51] Int. Cl.³ .............................................. G01M 3/32
[52] U.S. Cl. ....................................... 73/40; 73/49.2; 73/731
[58] Field of Search ................... 73/40, 49.8, 37, 731, 73/49.2, 49.3; 116/270, 266

[56] References Cited

U.S. PATENT DOCUMENTS 1,371,484 3/1921 Howard .................................. 73/40
2,897,669 8/1959 Villiers, Jr. et al. ............. 73/49.8 X
3,524,342 8/1970 Hobbs ..................................... 73/40

*Primary Examiner*—Gerald Goldberg
*Assistant Examiner*—Joseph W. Roskos
*Attorney, Agent, or Firm*—John E. Peele, Jr.; Robert J. Stern

[57] ABSTRACT

A method and device for leak testing vessels such as fuel cells or tanks which are large enough for a person to move around within holding a small hand held ball or balloon type device which is provided with a large aperture. In leak testing a vessel, the aperture portion of the device is pressed against the inside wall of the vessel with sufficient pressure to form an airtight seal between the inside of the device and the wall. While maintaining the airtight seal, the device is moved over the full inside surface of the cell. If there is a hole in the cell, the device which is very compliant will tend to collapse as it passes over the hole due to a resilient pressure drop created by the hole allowing the air to escape from the device to the atmosphere.

8 Claims, 6 Drawing Figures

FUEL CELL LEAK DETECTOR

GOVERNMENT RIGHTS IN THE INVENTION

The invention described herein may be manufactured and used by or for the Government of the United States of America for governmental purposes without payment of any royalties thereon. The Government has rights in this invention pursuant to Contract Number N00019-75-C-0424 awarded by the U.S. Navy.

BACKGROUND OF THE INVENTION (1) Field of the Invention

The present invention relates to testing of vessels or tanks for leaks and, more particularly, to leak testing fuel cells of aircraft after installation.

(2) Description of the Prior Art

The method used to test fuel tanks or cells for leaks prior to the present invention was to pressurize the tanks or cells with a gas such as compressed air and measure for a pressure drop. If a pressure drop existed, then the outside of the tank or cell was subjected to a standard soap test to pinpoint the leak.

The above method of pinpointing a leak is usable only prior to the installation of the cell into an aircraft since once installed the outside of the cell is inaccessable.

The present invention provides a method and a hand holdable apparatus for leak testing fuel cells both before and after installation in an aircraft. Most fuel cells for military aircraft are made of an elastic material and are large enough for a person to move around in the inside thereof. After manufacture, these fuel cells are collapsed, and are often installed in the aircraft through relatively small openings which may be no more than two (2) feet by three (3) feet. Therefore, it is desirable to test these cells for leaks possibly due to installation damage when in place.

STATEMENT OF THE PRIOR ART

The following patents are cited as the most pertinent prior art of which the applicant is aware:

| U.S. Pat. No. | Name | Date |
|---|---|---|
| 3,490,268 | W. Hand | 20 January 1970 |
| 3,996,789 | D. R. Wilson | 19 December 1976 |

U.S. Pat. No. 3,490,268 to Hand et al. on "Nondestructive Testing of Hull Stiffeners" relates to leak testing of bond areas between fiberglass hat shaped stiffeners and a ship's hull and/or deck.

The leak test method used by Hand et al., is to supply a gas, such as air, internal to the hat section and to test for leakage at the bond line between the flanges of the hat section and the hull and/or deck using standard leak detection means, such as soap testing, to determine the structural integrity of the bond areas.

The only relevance between the above cited patent and the present invention is that in each case, leak testing is accomplished by a person working inside a vessel.

U.S. Pat. No. 3,996,789 to Wilson on "Leak Detection" relates to leak testing a joint formed by bolting two flanged pipes together. The testing device includes a rubber strip used to hold the device to a pipe flange and rubber diaphragm which expands to provide a visual indication of leakage when the pipe is pressurized. The relevance of this invention is that a rubber diaphragm is used as a visual means for detecting leakage.

Neither of the above references suggests the present method of leak testing a fuel cell or the hand held device used in the method.

BRIEF SUMMARY OF THE INVENTION

This invention affords an efficient and cost saving method for accurately leak testing fuel cells and the like. The present invention is particularly useful in leak testing fuel cells installed in an aircraft where the outside of the cell is not accessable.

The apparatus or test device of the invention includes a hand held gas impermeable resilient ball or balloon having an aperture in one portion and an air or valve stem through which air may be supplied under pressure to the balloon. The balloon is filled with a low density open cell foam that tends to prevent the balloon from collapsing during normal handling but is compliant enough to compress under a pressure differential of approximately 2 psi.

In leak testing an unpressurized fuel cell, the stem of the balloon is connected to a regulated air supply. A person then enters the fuel cell and pushes the aperture of the balloon against the inside wall of the fuel cell until the lip of the aperture forms an airtight seal between the balloon and the wall of the fuel cell. While maintaining the airtight seal, the balloon is moved over the full inside surface of the cell. If there is a hole or rupture in the cell, the balloon will tend to collapse as it passes over the hole due to pressure inside of the balloon being vented to the atmosphere through the hole in the fuel cell.

The method used for leak testing a pressurized fuel cell includes the steps of selecting a tester device or balloon without an air stem, and entering the fuel cell. Thereafter, the cell is sealed and pressurized to slightly above the ambient atmospheric pressure. The person in the pressurized fuel cell then pushes the aperture provided in the balloon against the wall of the fuel cell until the lip of the aperture forms an airtight seal between the balloon and the wall of the fuel cell. When the balloon is moved over a hole in the fuel cell, the differential in pressure between the inside of the fuel cell and the outside atmosphere will cause the balloon to lose internal pressure and collapse.

An object of the present invention is to provide a method for leak testing a fuel cell installed in an aircraft.

Another object of the present invention is to provide a simple hand held apparatus for leak testing fuel cells and the like.

Although the characteristic features of the present invention are particularly pointed out in the appended claims, the method and apparatus in practicing the invention will be better understood by referring to the following description taken in conjunction with the accompanying drawings.

DETAILED DESCRIPTION OF THE INVENTION

Fluid retaining tanks or vessels, such as fuel cells used in most military and other large aircraft are made primarily of flexible, rubber-like material and as such are subject to damage during handling, installation and usage. During installation and extended usage, holes or ruptures can occur in the fuel cell permitting leakage therefrom of the contents thereof.

Prior to the present invention, there was no means available to test these fuel cells for leaks after installation into an aircraft or in the final assembly. This resulted in the fuel cells having to be removed from the aircraft, leak tested, repaired, and reinstalled in the aircraft, with the attendant risk of still other holes or ruptures being formed therein.

The present invention provides a means for leak testing fuel cells, which are large enough for a person to enter and work in the inside thereof, and which are installed in place, as in an aircraft. The leak testing device of the present invention has the general shape of a small ball or balloon, is hand held, and is compliant enough to be compressed or distorted with minimal hand pressure.

Figure 1:
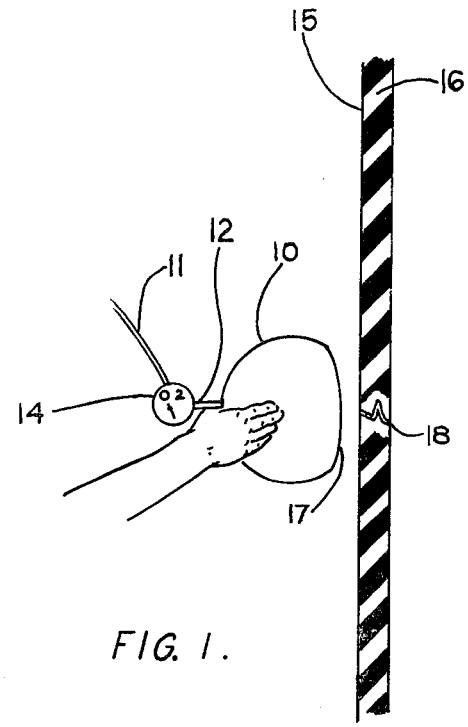
FIG. 1 is a fragmentary perspective view illustrating a manner in which a testing device is brought into contact with a wall of a non-pressurized vessel or fuel cell.

Referring now to FIG. 1, in using the present hand held device 10 to locate a hole or rupture in a non-pressurized fuel cell, a pressure line 11 from a low pressure air supply (not shown) is attached to an air or valve stem 12 having access to the interior of the device. A pressure gauge 14 is arranged in the air supply to indicate the air flow to and through the device. The air pressure from the air supply is then regulated to provide a pressure of from 2 to 5 psi above ambient atmospheric pressure. With the air supply regulated and the hand held device 10 held away from an inside surface 15 of a fuel cell wall 16, air is free to flow from the air supply (not shown) through the hand held device 10 and to exit through an aperture 17 provided in the device 10. Since no pressure is generated in the balloon-like device, the gauge 14 indicates the pressure at the ambient pressure. Thereafter, the device 10 is pushed against the inside surface 15 of the fuel cell wall 16 with sufficient hand pressure to cause the aperture 17 to form an airtight seal against the surface 15 of the wall 16. The airtight seal is verified when the pressure gauge 14 indicates the regulated air pressure provided by the air supply.

Figure 3:
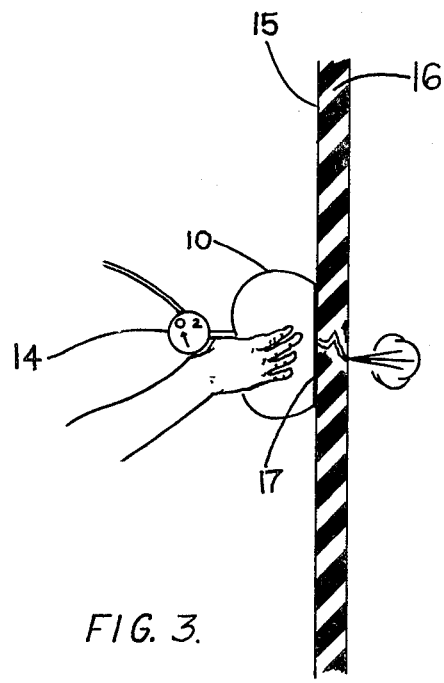
FIG. 3 is a fragmentary perspective view illustrating the device disclosed herein locating a hole or rupture in a test specimen of a tank or fuel cell.

While maintaining the airtight seal between the device 10 and the inside surface 15 of the wall 16, as shown in FIG. 3, the device 10 is moved by hand over the full inside surface of the fuel cell. If there is a hole or rupture 18 in the cell, the hand held device 10 will tend to collapse as it is moved over the hole or rupture 18 since some of the air under pressure inside the device 10 will be vented to the atmosphere. The pressure gauge 14 will show a drop in pressure indicating the relative size of the hole or rupture 18 in the cell. The location of the hole or rupture 18 can be marked for later repair.

Occasionally, a fuel cell installed in an aircraft will not leak under static conditions but will leak under pressure. In using the present invention, a leak of this type can be located by a person working inside a pressurized fuel cell.

Figure 4:
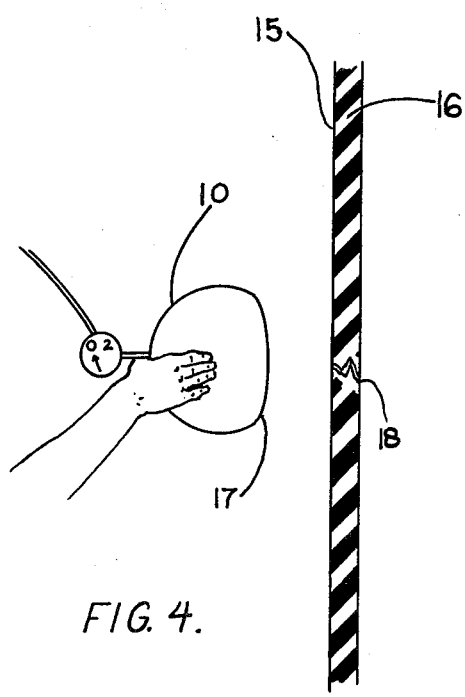
FIG. 4 is a fragmentary perspective view illustrating a manner in which the device of the present invention may be utilized in a pressurized tank or fuel cell.
Figure 6:
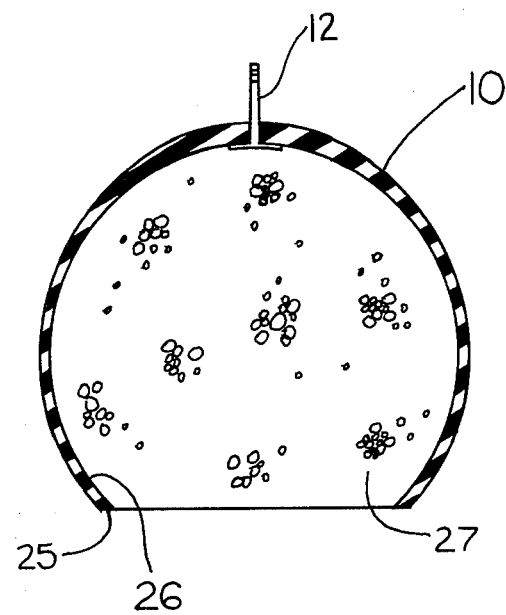
FIG. 6 is a cross-sectional view showing a mold utilized in the manufacture of the present device.

Referring now to FIG. 4, prior to using the hand held device 10 for leak testing a pressurized fuel cell, a cap 19 is placed over the air stem 12 to prevent the pressure of air therethrough.

Figure 2:
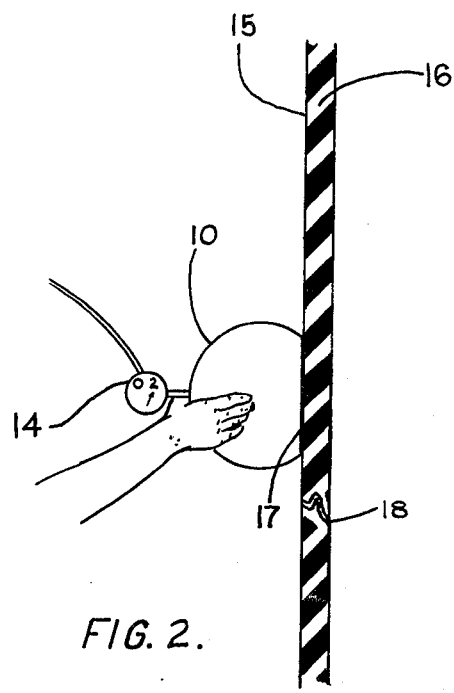
FIG. 2 is a fragmentary perspective view illustrating the manner in which the device disclosed herein is used to search for a hole or rupture in a fuel cell.

In leak testing a pressurized fuel cell, the hand held device 10 is pushed against the inside surface 15 of the fuel cell wall 16 with sufficient hand pressure to cause the aperture 17 to form an airtight seal between the hand held device 10 and the surface of the wall 16 (best seen in FIG. 2). While maintaining the airtight seal between the device 10 and the inside surface 15 of the wall 16, the device 10 is moved by hand over the full inside surface of the cell. If there is a hole or rupture 18 in the cell, the hand held device will tend to collapse as it is moved over the hole or rupture 18 since the pressure inside the device will be vented to the atmosphere, as shown in FIG. 3. The location of the hole or rupture 18 can be marked for later repair.

Figure 5:
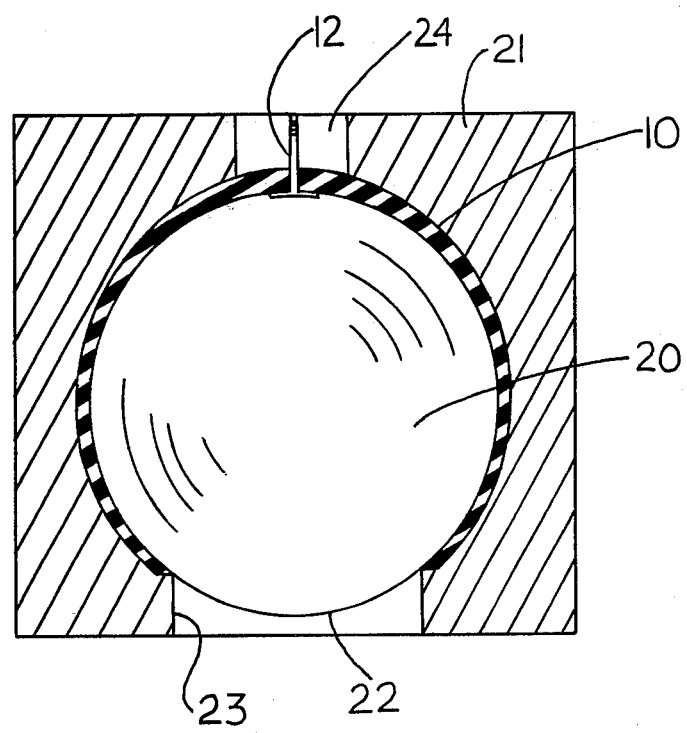
FIG. 5 is a cross-sectional view of the present leak testing device.

Referring to FIG. 5, the preferred method used to make the hand held device 10 is to first make or select a ball 20 of suitable molding material, such as plaster. Next, the ball 20 is placed in a standard split mold 21 having a spherical cavity 22, which is slightly larger in diameter than the ball 20. The split mold 21 is provided with a first hole 23 having a diameter that is preferably one half the diameter of the ball 20 and a second hole 24 of sufficient size to pour a room temperature curing resilient material over the ball 20. After the ball 20 is inserted into the mold 21 and the mold 21 is closed, an air tube or valve stem 12 is placed on or through the top of the ball 20. The mold 21 is then filled with a gas impermeable resilient material such as a room temperature curing adiprene or silicone rubber forming a body portion 25. If it is established prior to the manufacture of the device 10 that it will only be used in testing pressurized vessels, the air or valve stem 12 can be omitted.

After the resilient material 25 is cured, it is removed from the mold 21 and the ball 20 removed therefrom creating a cavity 26. The cavity 26 is next filled with an open cell foam 27 that is very compliant and offers minimum resistance to passage therethrough of a gas, such as air. The open cell foam holds the aperture 17 open during handling of the device 10. Other means (not shown) such as providing a wire stiffener around the aperture 17, and increasing the thickness of the molding material around the aperture 17 can be employed without departing from the spirit of the present invention.

The invention has been described as to structural features of the device and a method of leak testing fuel cells installed in aircraft in relatively specific language. It is to be understood that the invention is not limited to specific features shown and described for leak testing of fuel cells, or any vessel whether or not installed in an assembly, but that the construction of the device herein disclosed and the test methods described comprise the preferred form of practicing the invention.

I claim:

1. A method of leak testing non-pressurized vessels to find the location ruptures therein, comprising the steps of:

providing a hand held freely movable, leak testing device comprised of a gas impermeable resilient body having an aperture in one portion and gas communication means permitting pressurized gas to be introduced internally of said resilient body, said gas normally being free to exit said body through said aperture upon location of a rupture in the vessel, connecting said leak testing device to a regulatable gas pressure source to supply a regulated gas pressure to said resilient body of said leak testing device, pressing said leak testing device with the aperture thereof against a surface of the vessel with sufficient pressure to form an airtight seal between said surface of the vessel and said leak testing device, moving said leak testing device over said surface of the vessel while maintaining said airtight seal between said leak testing device and said surface whereby said leak testing device will tend to collapse as it is moved over a rupture in the vessel due to a differential in pressure between said engaged surface of said leak testing device and ambient atmospheric pressure on the opposite surface of the vessel thereby indicating the location of said rupture in the vessel.

2. The method of claim 1 including connecting a pressure guage between said resilient body and said pressure source whereby the relative size of said hole or rupture can be represented by the change in pressure as indicated by said guage.

3. The method of claim 1 including adjusting said pressure source to supply a regulated pressure of gas slightly above ambient atmospheric pressure.

4. A method of leak testing a pressurizable vessel such as a fuel cell using a hand held test device as in claim 7, comprising the steps of:

pressing said aperture of said device against the inside wall of said pressurizable vessel with sufficient pressure to form an airtight seal between said vessel and said device, moving said device over the inside surface of said pressurizable vessel while maintaining said airtight seal so that said device will collapse as it passes over a rupture in the vessel due to the pressure inside said device being vented to the atmosphere through said rupture.

5. A device movable freely over the wall of a vessel for detecting leaks in that vessel, the device comprising:

a gas impermeable resilient body having an aperture therein, and being deformable from a normal configuration when external pressure is applied thereto and internal pressure is reduced;

said resilient body being provided with a cavity; and reinforcing material being formed internally of said body cavity to support said resilient body configuration during the movement of said device over the wall of the vessel, and to hold said cavity in an open position when the pressure is reduced upon detection of a leak in the wall of the vessel.

6. The device of claim 5 wherein said reinforcing material is a compliant, open cell material substantially filling said body cavity.

7. The device of claim 5 wherein said reinforcing material is low density open cell foam.

8. The device of claim 5 wherein said resilient body is provided with a gas communication means for providing gas at a regulated pressure to the inside of said body to maintain said resilient body in pressurized condition when said aperture is closed by engagement against the wall of the vessel, and the said resilient body being collapsible when said aperture is aligned with a leak in the wall of the vessel.

* * * * *